June 3, 1969  L. O. CASEY  3,448,341
ELECTRICAL LOAD PROTECTION DEVICE
Filed Sept. 19, 1968
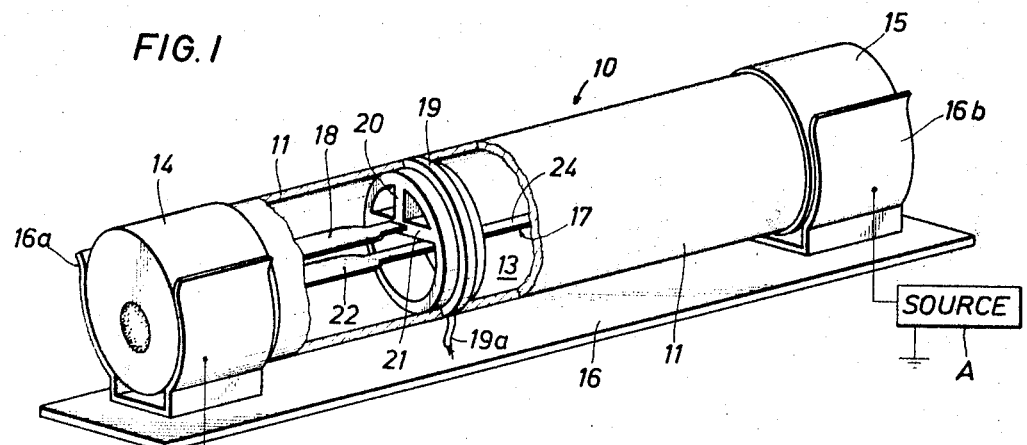
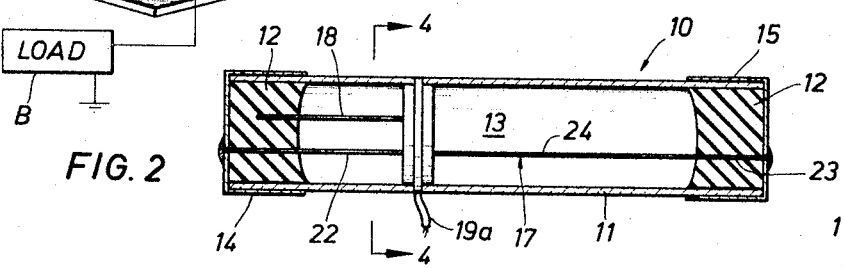
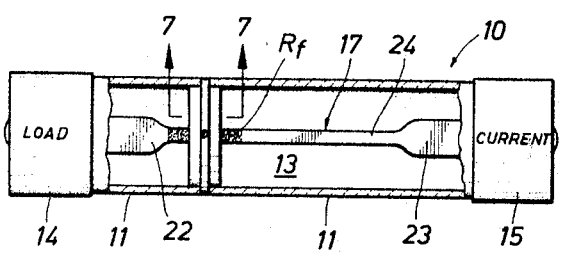
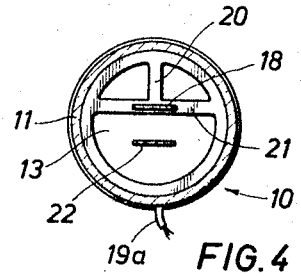
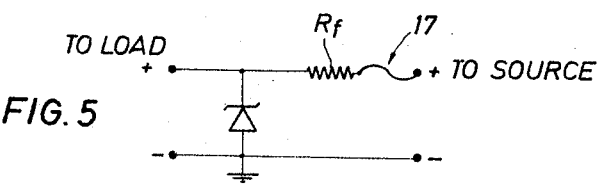
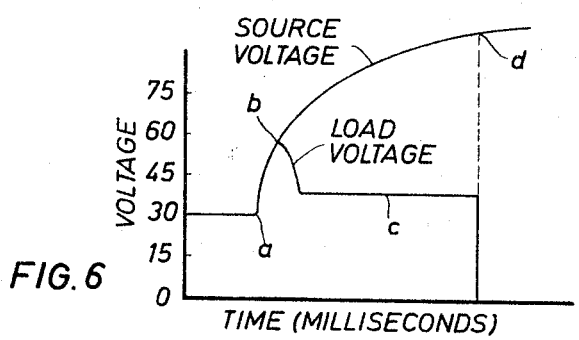
Lewis O. Casey
INVENTOR.
BY *Edward K. Fein*
*G. H. McCoy*
ATTORNEYS United States Patent Office 3,448,341
Patented June 3, 1969

3,448,341
ELECTRICAL LOAD PROTECTION DEVICE
Lewis O. Casey, Baytown, Tex., assignor to the United States of America as represented by the Administrator of the National Aeronautics and Space Administration
Filed Sept. 19, 1968, Ser. No. 761,404
Int. Cl. H02h *3/28;* H01h *85/14*
U.S. Cl. 317—31                          10 Claims

ABSTRACT OF THE DISCLOSURE

An in-line electrical load protection device is disclosed which includes a hollow, hermetically sealed, electrically non-conductive body portion filled with an inert gas, such as neon, an electrically conductive fuse link and a cathode element. The fuse link is connected at opposite ends to terminals that extend from the body portion for connecting the fuse link in a circuit between a source of electrical power and an electrical load. The fuse link will melt and open the circuit when the current through it exceeds a predetermined amount. The cathode element is spaced from the load side of the link and connected to a ground or other electrical common between the source and load. When the source voltage exceeds a predetermined value, current flows from the fuse link to the cathode through the gas. When this current, in combination with the load current, exceeds said predetermined amount, the fuse link melts. A resistive element may be provided in series with the cathode link conduction path to provide a range of constant voltage at the load side of the device when the source voltage is above said predetermined value and said combined currents are below said predetermined current.

---

The invention described herein was made by an employee of the United States Government and may be manufactured and used by or for the Government for governmental purposes without the payment of any royalties thereon or therefor.

Background of the invention

This invention relates to in-line fuse devices for protecting an electrical load from excessive currents and/or voltages.

In-line fuses are commonly used to protect electrical apparatus from excessive currents, however these fuses do not protect against excessive voltages. Protection against excessive voltage is of particular importance in fields such as aerospace and medicine, where astronauts and other human subjects are connected to electronic equipment which monitors various human functions. Electric shocks from voltage surges and faulty equipment are always a possibility when connected to such equipment. While voltage regulator circuits can be provided in the power source or the electrical apparatus connected thereto, they generally are relatively expensive, consume power, and provide no protection when they fail. Furthermore, they are not readily adapted for connection in the power line between the power source and any load, such as a fuse, so that positive protection is provided close to the load and irrespective of other protection devices that may fail.

Summary of the invention

It is thus an object of this invention to provide an in-line fuse device which will open the circuit when subjected to a predetermined source voltage and/or load current.

Another object is to provide a fuse device having a fuse link that will melt when the source voltage between the fuse link and the common or ground side of the circuit exceeds a given amount.

It is another object to provide a fuse device which will provide a conductive path for the current having a lower impedance than the load to protect the load from the shock of an excessive current when the source voltage exceeds a predetermined amount.

Another object is to provide such a fuse device that is of relatively simple and inexpensive construction.

Another object is to provide such a fuse device that provides for a load power fusing threshold, i.e., a combination of source voltage and load currents that would open the fuse link providing load power protection.

Another object is to provide such a fuse device that may be incorporated in a standard in-line fuse housing.

Another object is to provide such a device which provides a constant voltage to the load when the source voltage is within a predetermined range of voltages, and an open circuit in the power line when the source voltage and/or load current exceeds this range.

These and other objects, advantages, and features of this invention will be apparent to those skilled in the art from a consideration of the specification, claims and appended drawings.

In accordance with the invention, a voltage sensitive fuse device is provided by using the dielectric capacity of a gas. At a given source voltage, current will flow through the gas and shunt the load. This causes an increase in the flow of current which melts a fuse link at a given current flow.

Brief description of the drawing

The invention will now be described in detail in connection with the drawings in which, FIGURE 1 is a perspective view of the preferred embodiment of the load protection device of this invention with a portion of the body cut away to expose the inner construction;

FIGURE 2 is a vertical sectional view through the device of FIGURE 1;

FIGURE 3 is a bottom plan view of another embodiment of the load protection device of this invention with a portion of the body broken away;

FIGURE 4 is a sectional view taken along line 4—4 of FIGURE 2;

FIGURE 5 is the equivalent electrical circuit of the embodiment of the invention illustrated in FIGURE 3;

FIGURE 6 is a graph illustrating the voltage regulation characteristics of said embodiment; and FIGURE 7 is a partial sectional view taken along the line 7—7 of FIGURE 2.

Description of the preferred embodiments

The electrical load protection device of FIGURE 1 includes a gas tight cylindrical body 10 of electrically non-conductive material. The body includes hollow, tubular member or shell 11 which is closed at each end by plugs 12. Thermosetting epoxy resin is one material that can be used to form plugs 12 and hermetically seal the open ends of tubular member 11 to form gas tight chamber 13. Metal caps 14 and 15 are attached to the ends of body 10 by a suitable adhesive to provide electrically conductive material at each end of the body.

The device may be placed in series between a source of electrical power A and a load B by insertion into a standard in-line fuse holder 16 including clips 16a and 16b, or other suitable connecting means.

A fuse link 17 electrically connected to metal caps 14 and 15 forms the electrical connection between the electrical source and the load. The fuse link is an elongated strip of electrically conductive metal, which will melt at a relatively low temperature, such as one of the alloys of lead and tin commonly used as fuel solder.

Body shell 11 is constructed of material that is electrically non-conductive so that any current conducted from the source to the load will have to pass through fuse link 17. Body shell 11 is preferably made of ceramic or an opaque glass, such as smoked glass, for reasons which will be explained below.

The apparatus described so far is similar to an ordinary fuse connected in line between a power source and a load. Such fuses have a fuse link that will melt and open the circuit when the current flowing through the link exceeds a predetermined amount. The present invention includes in addition to such protection against excessive current, means for preventing the load from being exposed to excessive source voltage thereby preventing severe electrical shock to a person or sensitive electrical equipment. In the embodiment shown such means includes an inert gas, such as neon, which fills chamber 13 of the body and a cathode element 18. A circular ground ring 19 in chamber 14 supports one end of the cathode element. The other end of cathode 18 is embedded in and supported by one of plugs 12. Ring 19 is connected to the electrical common (not shown) between the voltage and current source and the load, which is usually ground, by wire 19a. Ground ring 19 may be the same diameter as tubular member 11 in which case tubular member 11 would be in two sections and connected to ground ring 19 by epoxy or other adhesive. If desired ground ring 19 may be indented as shown in detail in FIGURE 7 to provide a projection 19b against which ends of the two sections of tubular member 11 are abutted and bonded, and shoulders 19c and 19d on which these ends sit and are bonded. Alternatively, ground ring 19 may be of a smaller diameter so that it may be inserted into tubular member 11. As can be seen in FIGURE 1, ground ring 19 is provided with cross bars 20 and 21 connected to form an inverted T for supporting one end of cathode element 18.

Ground ring 19 supports cathode element 18 in spaced, parallel relationship with the load side of link 17. When the electrical voltage between the load side of the link and the cathode exceeds a predetermined value, the inert gas will fire and current will conduct from link 17 through the gas to cathode element 18. This increases the flow of current through link 17. By adjusting the spacing of cathode element 18 from link 17, the melting temperature of link 17 and the neon gas content in chamber 13, the conduction of current between link 17 and cathode element 18 can be made to occur at any desired voltage and the fuse link 17 can be caused to melt open instantaneously at that voltage or at some higher voltage, as desired. Further, control of the voltage at which current conducts between the link and the cathode element can be provided by sprinkling the neon gas or cathode element 18 with small radioactive particles to increase the conductivity between fuse link 17 and cathode element 18. Use of such radioactive particles would allow this conduction at relatively lower voltages than otherwise would be possible.

Link 17 has enlarged end portions 22 and 23 and an intermediate, narrow portion 24, wherein the fusion in response to excess current takes place. While it is not necessary that current pass completely through link 17, but only the intermediate portion 24, it is preferred that one of the enlarged ends, such as end 22, be connected to the load through cap 15 and that cathode element 18 be spaced from and parallel to this end. This insures that the current to the load and the current flowing to the cathode both pass through the fusible portion 24. As shown, cathode element 18 is of the same shape and size as end portion 22 so that current may conduct to the cathode from any point on end 22.

An alternate embodiment of the invention is shown in FIGURE 3. FIGURE 5 is the equivalent circuit of such embodiment. Since the same structure shown in FIGURES 1, 2, and 4 is used, the same reference characters will be used to indicate like parts. This embodiment not only protects against undesired high voltages but also serves as a voltage regulator when the source voltage is within a preselected range. To accomplish this, a resistance element is placed in series with the cathode element link current conduction path. Accordingly, there is an equivalent resistance $R_f$ located between fusible portion 22 and cathode 18. In operation, current will conduct through the gas to cathode element 18, allowing the voltage between them to reach a predetermined amount. This current will cause a given voltage drop across the equivalent resistance $R_f$. In this embodiment, the cathode resistor is selected so that the current is not sufficient to melt the fuse link. As the source voltage is increased, the anode voltage will remain steady. The voltage regulation is a feature of the inert gas used in the embodiment to regulate voltage and limit power. At a given higher voltage, however, the cathode current plus the load current will exceed the predetermined power necessary to melt link 17 and open the circuit. FIGURE 6 is a graph of time versus the voltage at the source and load side of the fuse device of FIGURE 3, when the source voltage is increased. For example, a voltage surge may be received at point $a$. The increased voltage will fire the gas between the cathode and the fuse at point $b$ and current will flow to the cathode. The source voltage can then continue to increase to the fusing voltage $d$, yet voltage $c$ to the load will remain constant. If the source voltage is increased beyond point $d$, fuse link 17 will melt open and load voltage drop to 0, so that the required protection from excess voltages (or power) is provided.

If the fuse device is to be used in the presence of light, it is preferred that the body shell be opaque because light will effect the point at which current will flow in the cathode if the inert gas is doped with a radioactive element.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An in-line electrical load protection device comprising, in combination: a hollow, gas tight body containing an inert gas and made of substantially electrically non-conductive material; an electrically conductive fuse link in said body which will melt and stop the flow of electrical current therethrough when such current exceeds a predetermined amount; means for connecting said link in series in an electrical circuit between a source of electrical current and voltage and an electrical load so that current passing from the source to the load will pass through said link; and a cathode element supported in said body for connecting to an electrical common between the source and load and spaced from the link so that when the electrical voltage between the link and cathode exceeds a predetermined value current will flow from the link through the inert gas to the cathode element to increase the flow of current through the link to melt the link when the current reaches said predetermined amount.

2. The device of claim 1 wherein said gas is neon.

3. The device of claim 1 wherein the current flow through the link when the voltage between the link and cathode reaches the value required to start current to flow therebetween is greater than the predetermined current amount required to fuse the link.

4. The device of claim 1 in which the fuse will melt when the voltage between the fuse and cathode reaches a second and higher value than said predetermined value and the device is further provided with a resistive element in series with the cathode link current conduction path to provide a voltage drop across said link in response to conduction of current through the cathode element when the source voltage is above said predetermined value and below said higher value whereby the voltage supplied to the load will be at a substantially constant value when the voltage between the fuse and cathode between said predetermined value and said higher value.

5. The device of claim 1 wherein the link is adapted to be connected at opposite ends through said connecting means to said source and load, and said cathode is located adjacent and spaced from the end of said link adapted to be connected to said load.

6. The device of claim 1 wherein said body material is opaque.

7. In an in-line fuse including a hollow, cylindrical body of electrically non-conductive material having a sealed chamber therein, a metal cap enclosing each end of said body to provide electrically conductive terminals at each end thereof, a fuse link of electrically conductive, fusible metal disposed in said body chamber and electrically connecting said metal caps to provide a path for electrical current to flow between the caps to a load, said fuse link melting open to stop such conduction when it exceeds a predetermined amount, the improvement in combination therewith of means for limiting the voltage conducted to such a load, said means including an inert gas filling said chamber, a cathode element disposed in said chamber so that voltage between the link and cathode greater than a certain value will cause current to flow between said link and cathode, thereby increasing the conduction of current through said link to melt the metal thereof when said increased conduction causes the current conducted through said link to exceed said predetermined amount; and means for connecting said cathode element to an electrical common between said source and load.

8. The fuse of claim 7 wherein said gas is neon.

9. The device of claim 7 in which the fuse will melt when the voltage between the fuse and cathode reaches a second and higher value than said predetermined value and the device is further provided with a resistive element in series with the cathode link current conduction path to provide a voltage drop across said link in response to conduction of current through the cathode element when the source voltage is above said predetermined value and below said higher value whereby the voltage supplied to the load will be at a substantially constant value when the voltage between the fuse and cathode is between said predetermined value and said higher value.

10. The device of claim 7 wherein the means for connecting the cathode element to an electrical ground includes a cylindrical body having a ground ring which is positioned at one end of the cathode element.

References Cited

UNITED STATES PATENTS

| | | | |
|---|---|---|---|
| 2,400,408 | 5/1946 | Haefelfinger | 317—40 X |
| 2,504,804 | 4/1950 | Clarke | 317—40 X |
| 2,886,744 | 5/1959 | McNatt | 337—32 X |
| 3,255,330 | 6/1966 | MacKenzie et al. | 337—34 X |

JOHN F. COUCH, *Primary Examiner.*

J. D. TRAMMELL, *Assistant Examiner.*

U.S. Cl. X.R.

317—16, 40; 337—31